United States Patent
Elektorowicz et al.

(10) Patent No.: US 8,329,042 B2
(45) Date of Patent: Dec. 11, 2012

(54) METHOD OF TREATING SLUDGE MATERIAL USING ELECTROKINETICS

(76) Inventors: Maria Elektorowicz, Montreal (CA); Jan Oleszkiewicz, Winnipeg (CA)

(*) Notice: Subject to any disclaimer, the term of this patent is extended or adjusted under 35 U.S.C. 154(b) by 517 days.

(21) Appl. No.: 12/571,482

(22) Filed: Oct. 1, 2009

(65) Prior Publication Data
US 2010/0078389 A1    Apr. 1, 2010

Related U.S. Application Data

(60) Provisional application No. 61/101,713, filed on Oct. 1, 2008.

(51) Int. Cl.
C02F 1/469    (2006.01)
C02F 1/42     (2006.01)
C02F 1/66     (2006.01)

(52) U.S. Cl. .......... 210/748.01; 210/764; 210/770; 210/668; 210/669; 210/767; 204/157.15; 204/450; 204/518; 204/520; 204/529

(58) Field of Classification Search .......... 210/668, 210/669, 663, 660, 681, 688, 748.01, 767, 210/263, 683–685, 764, 770; 422/22, 186.03, 422/186.04, 608; 205/687–772; 204/157.15, 204/164, 450, 518, 520, 529, 193, 286.1, 204/553
See application file for complete search history.

(56) References Cited

U.S. PATENT DOCUMENTS

2004/0245184 A1* 12/2004 Umezawa et al. ........... 210/748
2007/0227905 A1* 10/2007 Akahori et al. ............. 205/772
2008/0073288 A1*  3/2008 Fan et al. .................... 210/748

FOREIGN PATENT DOCUMENTS

JP    08309359 A   * 11/1996

* cited by examiner

*Primary Examiner* — Joseph Drodge
*Assistant Examiner* — Cameron J Allen
(74) *Attorney, Agent, or Firm* — Ryan W. Dupuis; Kyle R. Satterthwaite; Ade & Company Inc.

(57) ABSTRACT

Sludge is treated in a treatment chamber by providing a pair of electrodes in the treatment chamber and applying an electrical current between the electrodes such that one of the electrodes functions as an anode and one of the electrodes functions as a cathode in proximity to the outlet. A flow of water is induced from the sludge towards the outlet by the electrical current. An ion exchange textile comprising exchangeable functional groups grafted thereon is located in proximity to at least one of the electrodes such that the ionic forms of the metals are exchanged with the functional groups on the ion exchange textile. Accordingly the sludge is dewatered and metals in the sludge are captured commonly in the treatment chamber while the electrical current simultaneously inactivates pathogens in the treatment chamber.

20 Claims, 4 Drawing Sheets

METHOD OF TREATING SLUDGE MATERIAL USING ELECTROKINETICS

This application claims the benefit under 35 U.S.C. 119(e) of U.S. provisional application Ser. No. 61/101,713, filed Oct. 1, 2008.

FIELD OF THE INVENTION

The present invention relates to a method and system for treating sludge, for example municipal and industrial sludge, oily sludge including petroleum sludge and general wastewater sludge, using an applied electrical field, a conditioner, for example ammonia salts, and an ion exchange textile for simultaneously dewatering the sludge, inactivating pathogens in the sludge and removing metals and the like from the sludge.

BACKGROUND

In the treatment of wastewater, it is generally desirable to remove water content through dewatering, inactivate pathogenic micro-organisms, spore, and helminth, remove/deposit heavy metals, remove/change or decrease endocrine disrupting compounds, and/or remove other undesirable compounds which may be organic or inorganic.

The dewatering process removes water, increases the concentration of solids, and reduces volume, thus reducing the costs of further treatment and handling. Dewatering in practice is accomplished through natural (e.g. evaporation, gravity, etc.) and mechanical methods. The most often used mechanical dewatering devices include centrifuges, belt filter presses, screw presses, etc. All of these commonly used dewatering techniques however do not improve the chemical composition of biosolids and pathogen removal is typically done separately and requires a long time. Dewatering does not remove metals or pathogens and converts sludge slurry to a cake of approx 20-30% Total Solids (TS).

Inactivation is performed infrequently, though there is a growing emphasis on Class A biosolids sent to agriculture. Class A means (according to US EPA) biosolids can be beneficially utilized without any restrictions. Typical inactivation may include addition of chemicals (oxidation agents, acids or lime); heat treatment (70 to 150° C.); thermophilic digestion; heat drying. In most cases target pathogen-indicators are fecal coliforms (FC) or total coliforms (TC); very rarely *Salmonella* content is checked. Viruses, *Clostridium* p. or helminth ova (eg. *Ascaris*) are often used as indicators of the efficiency of disinfection.

Heavy metals are not known to be removed at all in any prior art wastewater treatment. Biosolids containing excessive heavy metals cannot be utilized and must be disposed in landfill. Sludge disposal in landfills is not permitted in Europe and getting to be so in America.

Furthermore, Endocrine Disrupting Compounds (EDC) removal is not accomplished on purpose in the conventional biosolids processes. It is anticipated that regulators will want EDC removed before land application.

One known process for simultaneous dewatering and pathogen inactivation involves applying potential gradients to sludge to be treated in the presence of a liquid conditioner. Removal of metals however must be accomplished in a separate process in the prior art.

SUMMARY OF THE INVENTION

According to one aspect of the invention there is provided a treatment method for treating sludge, the method comprising:

providing a treatment chamber having an effluent outlet;
placing the sludge to be treated in the treatment chamber;
providing a plurality of electrodes in the treatment chamber so as to be in communication with the sludge;
applying an electrical current between the electrodes such that at least one of the electrodes functions as an anode and at least one of the electrodes functions as a cathode and such that ionic forms of metals in the sludge are drawn towards at least one of the electrodes;
locating at least one of the electrodes in proximity to the outlet such that a flow of water is induced from the sludge towards the outlet to dewater the sludge;
providing an ion exchange textile comprising exchangeable functional groups grafted thereon; and
locating the ion exchange textile in proximity to said at least one of the electrodes in proximity to the outlet such that the ionic forms of the metals are exchanged with the functional groups on the ion exchange textile;
whereby the sludge is dewatered and metals in the sludge are captured commonly in the treatment chamber.

Known prior art electro-dewatering is typically concerned with primary or combined (primary and secondary) sludge, not anaerobically digested sludge. In other technologies, to make electro-drying successful, the electrokinetic process (EK) was combined with other methods e.g. coagulation process (addition of polymer or some forms of Al or Fe). However in the end, these technologies increase the amount of metals and other chemicals in the final product. In the present technology, the conditioner substitutes for the coagulant; however, its role without application of electrical field would be nil. Furthermore, without EK generated at a particular voltage (moderate voltage gradient), we cannot achieve the same results.

The treatment method and system of the present invention is generally referred to herein as ElectroKinetics, Dewatering, Inactivation of pathogens and Metal removal (EKDIM). The liquid formed during the EKDIM process out of biosolids is easy to manipulate and pump out from reservoirs collecting catholyte and anolyte (as its state is similar to other types of industrial wastewaters). The ion exchange textiles (IET) are not applied as often as other types of ion exchange materials (synthetic or natural), which are easier to work with in exchange columns.

The idea of introducing of IET into biosolids treatment using electrokinetic transport is unknown in the prior art. It would be unnecessary to pump throughout the textile viscous liquids with a high content of suspended material. It would lead to their fast fouling and biofilm formation. The ion exchange processes are used to liquid industrial wastewater with dissolved metals.

According to the present invention, preferably the electrical current is applied between the electrodes such that pathogens in the sludge are inactivated in the treatment chamber.

When the ion exchange textile is porous, preferably the ion exchange textile is located to span the effluent outlet such that effluent must pass through the ion exchange textile to reach the effluent outlet.

An ion exchange textile may be located in proximity to both the anode and the cathode. The cathode is preferably located in proximity to the outlet.

Preferably different exchangeable functional groups are grafted onto the ion exchange textile in proximity to the anode than the exchangeable functional groups grafted onto the ion exchange textile in proximity to the cathode.

The ion exchange textiles are preferably replaced periodically.

The method may further comprise liberating cationic species by electro-chemical oxidation and exchanging the cationic species with the ion exchange textile at the cathode, as well as electro-migrating ionic species in the sludge towards the anode and providing an ion exchange textile in proximity to the anode to be exchanged with the anionic species.

The cathode may comprise a conductive body with passages therethrough which is supported to span the effluent outlet such that effluent must pass through the passages in the cathode to reach the effluent outlet.

In some embodiments a plurality of cathodes are supported in an array arranged for communication with the sludge in which there is provided an outlet passage in proximity to each cathode in communication with the effluent outlet.

When the electrodes are supported in an array within the treatment chamber in which each cathode includes an outlet passage in communication with the effluent outlet, the method may further comprise applying the electrical current to the electrodes such that at least some of the electrodes are alternately operated as the anode and the cathode.

Metal compounds in the sludge are preferably converted to more soluble ionic forms prior to exchanging the ionic forms with the functional groups on the ion exchange textile. Preferably an area of increased oxidation is formed and a pH level is reduced in proximity to the anode.

A conditioner is preferably injected into the sludge such that the metals are converted to more soluble forms prior to being exchanged with the functional groups on the ion exchange textile. The conditioner may comprise ammonia salts and may be premixed with the sludge prior to applying the electrical current between the electrodes.

The conditioner may be injected adjacent said at least one of the electrodes locating the ion exchange textile in proximity thereto.

When the electrode is surrounded with the ion exchange textile, the conditioner may be injected between the electrode and the ion exchange textile.

The injected amount of conditioner may be varied in amount per unit volume of sludge to control a level of dewatering, a level of pathogen inactivation and a level of metal removal from the sludge.

In some embodiments, one of the electrodes in proximity to the outlet comprises a core of conductive material surrounding an outlet passage in communication with the effluent outlet in which the core includes passages therethrough arranged to receive effluent and a conductive mesh material having openings therein which are smaller than the passages in the core spanning the passages in the core. The electrode is preferably surrounded with the ion exchange textile in which a spacer element is provided between the electrode and the surrounding ion exchange textile to support the ion exchange textile spaced outwardly from the electrode.

The electrodes may be supported on a common carrier so as to be arranged for vertical displacement through an open top end of the treatment chamber.

In some instances, the method preferably includes: forming each electrode to comprise a conductive body with passages therethrough surrounding an outlet passage in communication with the effluent outlet such that effluent must pass through the passages in the electrode to reach the effluent outlet; initially dewatering the sludge through the outlet passages in both the anode and cathode; and subsequently dewatering the sludge only through the outlet passages associated with the cathode.

In a continuous flow process, the method may include: i) displacing the sludge through the treatment chamber in a continuous flow from a waste inlet of the treatment chamber to a sludge outlet of the treatment chamber; ii) forming a bottom of the treatment chamber to include passages therein in communication with the effluent outlet; and iii) locating the ion exchange textile and the cathode adjacent the passages in the bottom wall in communication with the effluent outlet. The cathode is preferably located adjacent the bottom end of the treatment chamber with the ion exchange textile being supported to span the effluent outlet below the cathode.

Transport of metals is typically done due to ionic transport and electroosmotic transport.

In the presence of metal complexes, the ion exchange takes place and functional groups are exchanged with metals which are released in an environment close to the textiles. Subsequently, they change pH, redox potential, electrophoretic transport, etc.

Organic/mineral colloids transported due to electrokinetic phenomena are not settled on the textile. A barrier is created around the electrodes, which facilitates the collection of water between the IET and the barrier permitting for much more efficient exchange and drainage out.

The textile is not always installed on the electrodes (as it could be visible in several membrane/electrode designs) in order to control redox and pH gradient, and subsequently all phenomena.

The textiles are positioned at a distance from a metallic mesh of the electrode which permits a free evacuation of gases formed on the anode and the cathode.

In the above described context the ion exchange textiles have not been used before in the prior art.

Conditioner as described herein is preferably an ammonia nitrate compound, or any ammonia fertilizer. It decreases the cost of the operation as it is used commonly in the agriculture industry.

Nitrate and nitric acid are generated from ammonia oxidation. Organo-metallic forms are transformed to ionic forms or much more mobile complexes. Subsequently, oxidation at the anode generates an acidic front; it oxidizes ammonia, as well as oxidizes organo-metallic compounds. At low pH and high redox potentials, metals change speciation: are present in free ion forms, or they form soluble complexes, then can be transported towards the cathode (by the ionic or electroosmotic transport). Since the position of the cationic exchange textile is at a distance (where pH is not very high yet), metallic species can undergo the ion exchange process without precipitation.

In common electro-chemical processes performed for metals which are soluble in industrial wastewater, contrary to sludge with a high colloid content, the well defined pH gradient between cathode and anode is not observed. However, in dense colloidal suspensions, it pronounces visibly (the higher solids content the more obvious is this gradient). Therefore, with changing the properties of the medium with time, different processes are prevalent in the biosolids system. This is the phenomena which are entirely controlled by EKDIM. It includes an accurate voltage gradient, a soluble fertilizer based on ammonia salts, and a design of electrodes with ion exchange textiles.

Higher voltage creates a higher oxidation process; however, there are some limits since the high voltage does not influence positively the flocs' formation in all sludges leading to several negative phenomena (including hindering achievement of high-solids dewatered sludge cake).

Position of electrodes is also important. Central and circumferential positioning of the electrodes can generate a higher pH gradient with the same voltage applied. In addition, electrodes positioned in an alternating sequence (e.g. anode-cathode-anode-cathode-etc.) might create a more efficient distribution of electrical field than the positioning of electrodes in anode rows and cathode rows.

The method may further comprise applying an electrical current between the electrodes until a temperature in the treatment chamber is sufficiently elevated to eliminate spores and *Helminth ova*.

In summary, the application of an electrical field creates the following:

- Oxidation of all compounds present in the anode area, generation of $H+$, $O_2$, $Cl_2$, $H_2O_2$, decreasing pH, oxidizing ammonia, formation of free ions of metals, producing acidic conditions.
- Reducing of compounds in the cathode area, generation of $OH-$, $H_2$, increasing pH.
- A pH gradient between the cathode and anode.
- Influence on diffuse double layer of colloids permitting on coagulation process.
- Removal of interstitial water associated with colloids, forming more dense flocs which settle faster.
- An electroosmotic flow permitting water transport with certain polar and non-polar compounds mostly towards the cathode.
- An electrophoretic transport of colloids mostly towards the anodes. Some organic colloids might have positive charge and tendency to flow to the cathode. Generally, the addition of the conditioner prevents it depending upon voltage applied and conditioner concentration.
- Removal of interstitial water, electroosmotic transport, and settling of dense flocs to create a supernatant easy to be drained in which all these conditions are favorable for water removal.
- Initiates the corrosion of electrodes introducing Me(III) ions to decrease diffuse double layer leading to easier flocculation, phosphorous removal, Fenton reaction (in case of iron electrode).
- Conditions where inactivation of pathogens is observed.
- Enhance the effectiveness of the conditioner for inactivation processes.
- Under high pH conditions un-ionized ammonia which inactivates spores and *helminth ova*. In fact both oxidation and reducing conditions affect all layers which form complex structures of spores and eggs.
- Controlling application of DC between electrodes can also control temperature in sludge with a conditioner. A pulsing increase of temperature can also inactivate helminth ova.

In summary, the ion exchange textiles in the present invention initiate the following:

- Exchange cations at cathode area and anions in anode area.
- Release sodium in the cathode area influencing solids behavior.
- Release tertiary (or quaternary) ammonia (or other functional groups) in the anode area influencing solids behaviour.
- Decrease pH gradient preventing too high oxidation or controlling the oxidation at anode and reduction at cathode, and subsequently influencing metal speciation and inactivation.
- Preventing precipitation of metals in cathode area.
- Creating a "barrier" preventing the transport of gel-like colloids that usually clog the membranes.
- Preventing the biofilm formation on electrodes and IET.
- Attenuating the temperature generated when higher voltage is applied.
- Attenuating the transport of corrosion by-products into biosolids.
- Forming an additional barrier which prevents microorganisms transport into catolyte, particularly in the first phase of the treatment.
- Forming the additional barrier surrounding electrodes which generate an additional stressor for microorganism inactivation.

In summary, the conditioner according to the present invention initiates:

- Conditions where oxidation of ammonia to nitrates takes place.
- Enhanced oxidation of microorganisms leading to their inactivation.
- Preventing of the oxidation of the anode material.
- Change of electrolyte (biosolids) properties helping in the coagulation, dewatering and forming additional stressors for microorganism inactivation.
- Introducing un-ionized ammonia preserving it due to pH gradient which inactivates spores and *helminth ova*.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
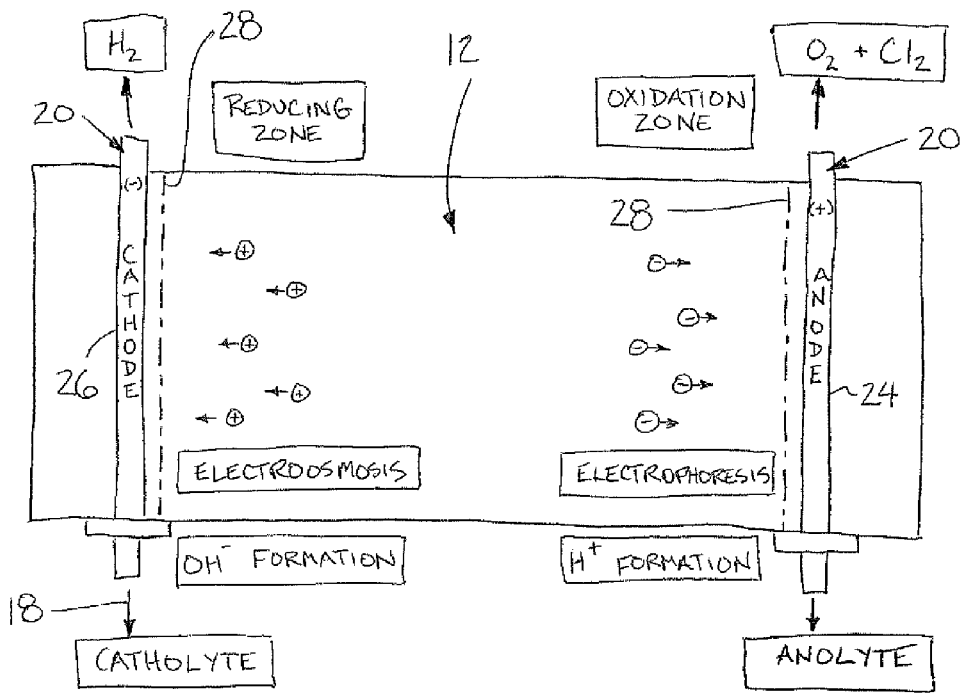
FIG. 1 is a schematic representation of the treatment method according to the present invention.

Referring to the accompanying figures there is illustrated a sludge treatment system generally indicated by reference numeral 10. Although various embodiments of the system are described in the following, the common features of each will first be described herein.

The system 10 comprises a treatment chamber 12 arranged to receive the sludge material to be treated therein. The treatment chamber 12 includes a sludge inlet 14 through which the sludge is introduced into the chamber, and a treated sludge outlet 16 from which the dewatered and treated sludge is arranged to be removed from the chamber. Also provided is an effluent outlet 18 from which the water removed from the sludge 14 is received for removal from the treatment chamber 12.

A plurality of electrodes 20 are supported within the chamber 12 so as to be arranged to communicate with the sludge in the chamber. A suitable power supply 22 is coupled to the electrodes so as to apply an electrical potential difference to the electrodes to induce a current through the sludge between the electrodes. Connection of the electrodes 20 to the power supply 22 defines some of the electrodes as anodes 24 and some of the electrodes as cathodes 26.

At least the cathodes comprise a conductive body including passages therethrough through which the effluent is arranged to be communicated. The cathodes 26 are thus arranged to span the effluent outlet 18 of the chamber 12.

An ion exchange textile 28 is provided in proximity to at least the cathodes 26 so as to similarly span the effluent outlet 18 of the chamber. The textile 28 comprises a porous nonwoven fabric (e.g. viscose), grafted with polymers containing exchangeable functional groups which are ready to be exchanged with ionic elements in the sludge.

A conditioner injector 30 is provided for injecting a conditioner into the sludge. A preferred conditioner comprises ammonium salts which works with electrolysis of the water in the sludge by the electrodes 20 to favor creation of oxidation zone having a low pH adjacent the anode 24 as well as changing metal compounds in the sludge to more mobile and soluble ionic forms and a reduction zone having a high pH adjacent the cathode 26, These mechanisms also serve to collectively inactivate pathogens in the sludge.

When power is supplied to the electrodes 20, a flow of water is induced towards the cathode adjacent the effluent outlet 18 which in turn carries the soluble ionic forms of the metals in the sludge towards the ion exchange textile 28 at the cathode. The effluent from the sludge in the chamber must pass through the textile 28 to reach the effluent outlet 18 such that the ionic forms of metals are exchanged with the functional groups on the textile to be captured and removed from the waste 14 and from the effluent 18.

Figure 2:
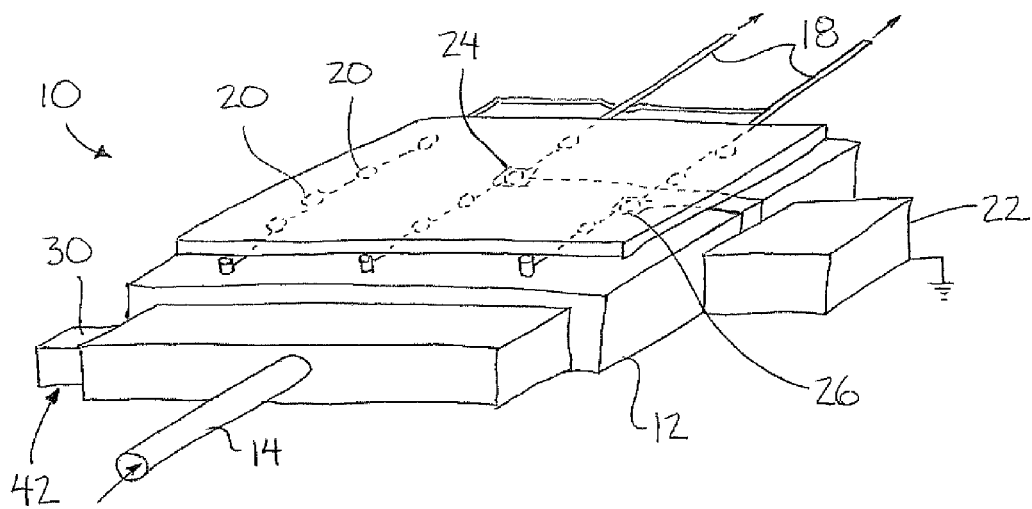
FIG. 2 is a perspective view of a first embodiment of a batch treatment chamber.

Turning now to FIG. 2, a batch system is illustrated in which the treatment chamber 12 is generally rectangular comprising a flat bottom wall and upright side walls for containing the sludge material therein. The electrodes in this instance are supported in an array on a carrier which can be displaced vertically relative to the chamber for lowering the electrodes through an open top end of the treatment chamber for communication with the sludge in the chamber. The electrodes are provided in a spaced apart grid pattern in which all of the electrodes are substantially identical in configuration so that the electrodes can be alternately used as anodes or cathodes.

More particularly each electrode 20 comprises a conductive body including a cylindrical core 32 and a surrounding conductive mesh 34. The core 32 surrounds an outlet passage 36 having a central drain in connection with the effluent outlet 18. The core 32 includes a plurality of passages formed therethrough to permit fluid from the sludge to drain through the passages in the core 32 to the outlet passage 36 in communication with the effluent outlet 18. The conductive mesh 34 includes smaller size openings therein for spanning the passages formed in the core 32 to even out the electric field surrounding each electrode. A non-conductive spacer 38 surrounds the mesh 34 and the core 32 of the electrode which similarly includes a plurality of grid spaced openings therein through which fluid can be communicated. The ion exchange textile 28 in this instance surrounds the spacer 38 about each electrode. The textile and the electrode core thus each extend about the central passage communicating to the effluent outlet 18 so that fluid from the sludge must pass through the textile followed by the passages in the electrode prior to reaching the effluent outlet 18. A protective cover 40 comprising a non-conductive material in a grid formation with openings therein surrounds the textile 28 about each electrode to support and protect the electrode while permitting fluid to flow therethrough.

In operation the sludge is initially placed in the treatment chamber and then the electrodes in the form of the array are lowered down into the chamber to communicate with the sludge therein. Some of the electrodes are coupled to the power supply to function as an anode while some of the electrodes are coupled to the power supply to function as a cathode. Initially effluent is drained from the outlet passages 36 of all of the electrodes until a prescribed dryness of the sludge is achieved. Thereafter the outlet passages 36 in the electrodes remain open for draining fluid therethrough. The textile provided on each of the anodes and each of the cathodes differs from one another to provide functional groups for ready exchange with anions and cations in the waste respectively.

In some instance of operation, the electrical current (DC) may be applied between the electrodes until a temperature in the treatment chamber is raised temporarily and becomes sufficiently elevated (for example in the order of 50° C.) that *Helminth ova* and/or spore can be eliminated. A suitable temperature monitor could be incorporated into the treatment chamber in this instance for indicating the temperature to a controller which determines the application of the electrical current between the electrodes.

The chamber 12 according to FIG. 2 also communicates with a premixing chamber 42 in series with the waste inlet 14 where the conditioner is injected for mixing with the sludge prior to exposure of the sludge to the electrodes 20. Once the sludge is treated, the sludge is typically discharged through the top or bottom end of the chamber by opening a suitable door forming the treated sludge outlet 16 noted above.

Figure 3:
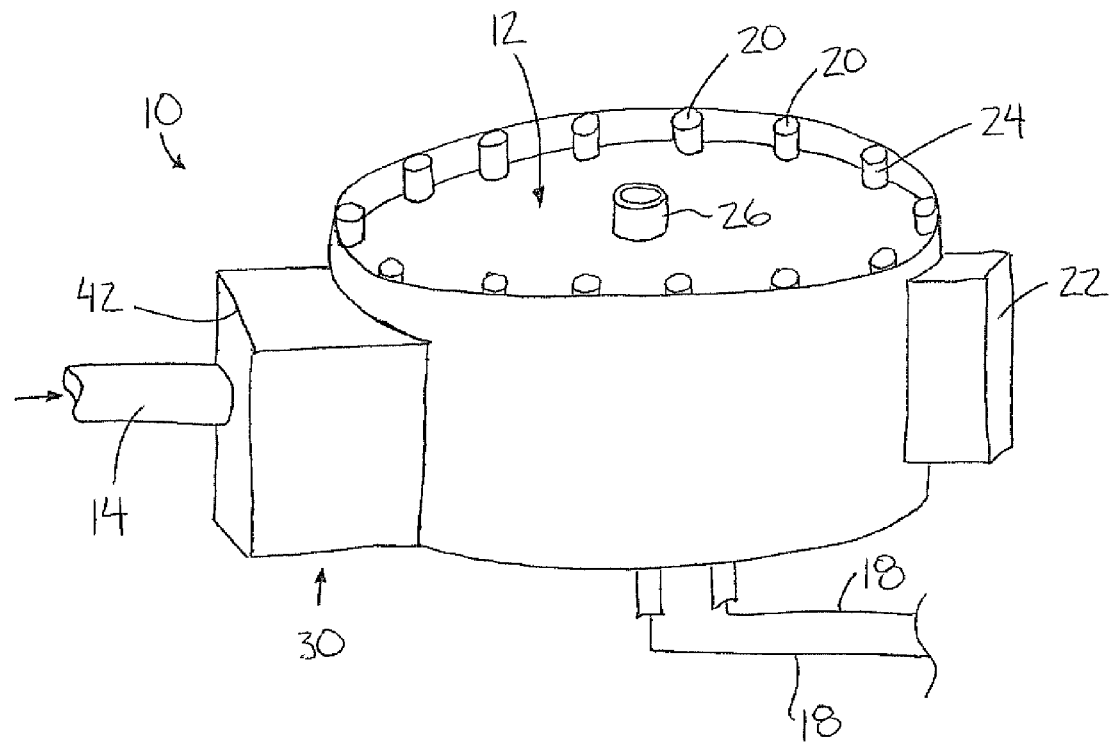
FIG. 3 is a perspective view of a second embodiment of a batch treatment chamber.
Figure 4:
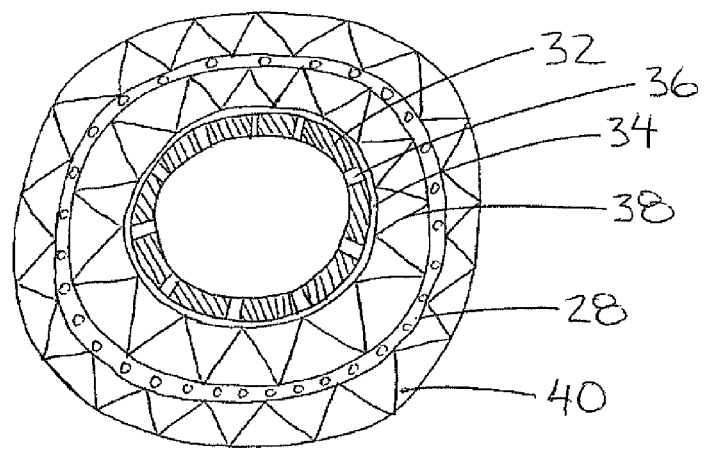
FIG. 4 is a cross sectional view of one of the electrodes in the batch system.
Figure 5:
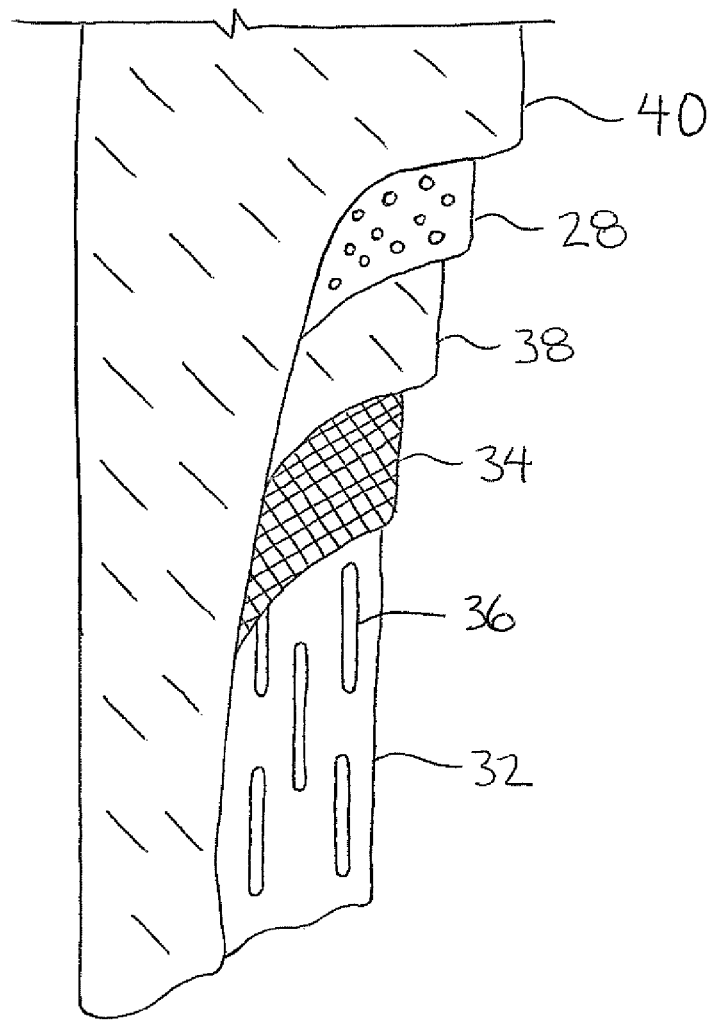
FIG. 5 is a partly sectional elevational view of the electrode according to FIG. 4.

Turning now to FIG. 3, the treatment chamber 12 in this instance is generally cylindrical in shape including a flat bottom and upright side walls as well as a top wall for enclosing the chamber. The sludge is again mixed in a premixing chamber 42 with conditioner as the sludge enters the chamber through the sludge inlet 14. In this embodiment a central cathode is provided having a configuration as described above and as illustrated in FIGS. 4 and 5 with regard to a central passage 36 communicating with the effluent outlet 18 surrounded by a cylindrical core 32, a surrounding mesh 34 and a cylindrical shaped ionic exchange textile 28 held in place between a non-conductive spacer 38 and a protective cover 40. The anodes in this instance are provided at circumferentially spaced positions about the periphery of the treatment chamber 12 and are again similarly configured to the electrodes 20 described above in the previous embodiment. Similar to the previous embodiment the anodes and cathode together can be used for draining fluid initially, followed by only fluid being drained from the cathode.

In a variation of the embodiment of FIG. 3, the central electrode may comprise the anode and the circumferentially spaced electrodes about the periphery of the chamber may comprise cathodes such that the majority of dewatering takes place at the periphery of the chamber.

In yet further embodiments, instead of premixing the conditioner, the conditioner may be injected adjacent the electrodes 20. In this instance the conditioner injectors 30 may be provided at circumferentially spaced positions within the spacer 38 between the conductive body of the electrode and the surrounding ionic exchange textile 28.

Figure 6:
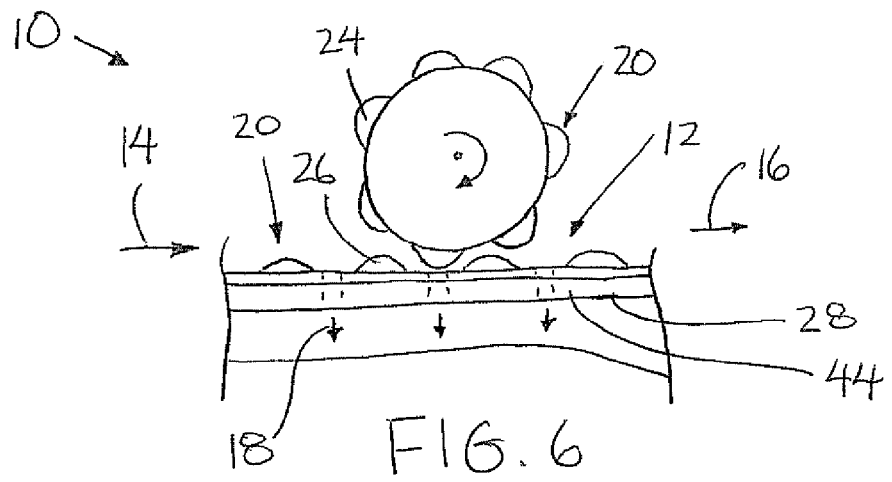
FIG. 6 is a schematic representation of a first embodiment of a continuous flow treatment chamber.
Figure 7:
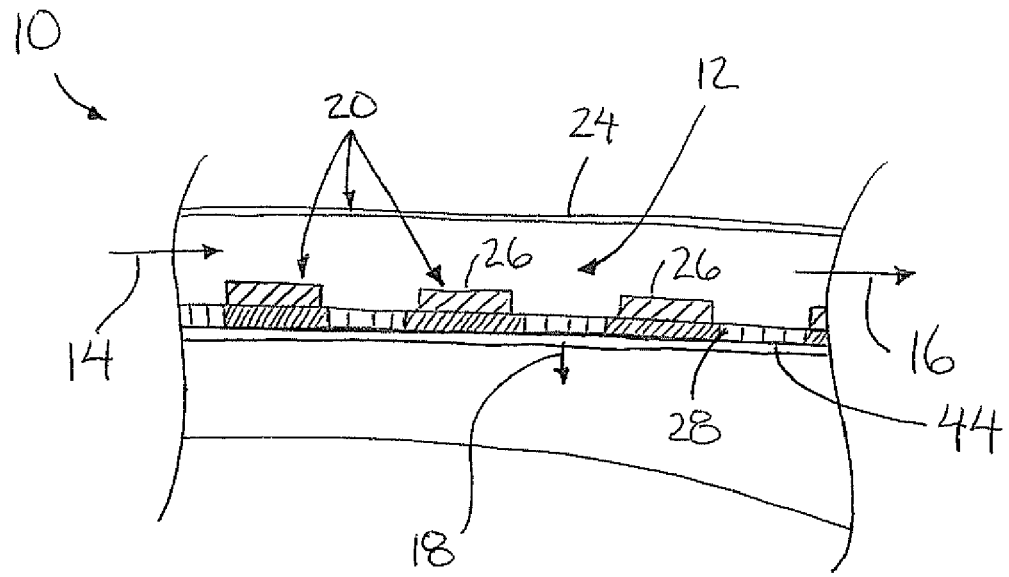
FIG. 7 is a schematic representation of a second embodiment of a continuous flow treatment chamber.
Figure 8:
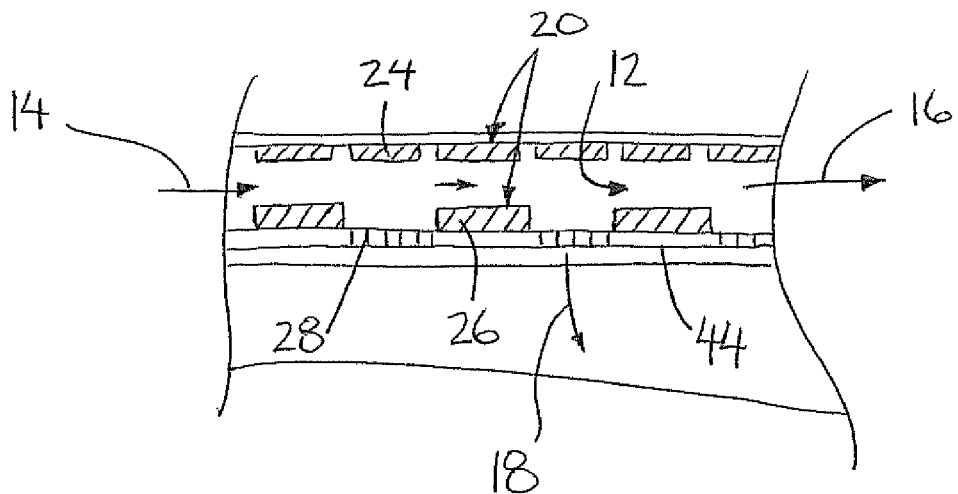
FIG. 8 is a schematic representation of a third embodiment of a continuous flow treatment chamber.

Turning now to FIGS. 6 through 8, various continuous flow treatment chambers are illustrated in which the sludge inlet 14 and the treated sludge outlet 16 are provided at opposing ends of the chamber such that the sludge is treated as it is displaced from the inlet to the outlet. In each embodiment the bottom wall of the chamber typically comprises a moving conveyor member 44 which is porous to allow fluid removed from the waste to pass therethrough to the effluent outlet 18 below the conveyor. The conveyor 44 serves to support the ion exchange textile 28 thereon spanning the passages from the chamber to the effluent outlet 18. The cathode in this instance comprises a plurality of conductive elements supported on the conveyor above the textile at the bottom of the chamber. In each instance, the anode 24 is supported at the top wall of the chamber.

In FIG. 6, the top wall comprises the outer surface of a rotating cylindrical member supported in close proximity to the conveyor 14 to assist in pressing the sludge between the top and bottom walls when the cylindrical member is rotated with the linear displacement of the conveyor from the inlet to the outlet. Each anode is arranged for alignment between a pair of cathodes in the longitudinal direction as the rotating member is rotated along with longitudinal displacement of the conveyor.

In the embodiment of FIG. 7, the top wall comprises a continuous conductive surface along which the waste material is displaced with movement of the conveyor 44 in the longitudinal direction. In the embodiment of FIG. 8, a continuous supporting surface is provided to define the top wall which supports a plurality of separate anode elements thereon.

In any of the embodiments of FIGS. 6 through 8, connection of the power supply 22 to the anode and the cathodes respectively induces a flow of fluid from the anode at the top of the chamber to the cathodes at the bottom of the chamber which draws ions in the waste towards the textile 28 as the fluid is drawn towards the cathode.

In further embodiments, the ionic exchange textile 28 may also be provided to span overtop of the cathodes so that the effluent from the waste material must similarly pass through the textile to reach the cathode.

A first challenge in treating sludge is the medium itself. It is referred to herein using the general term "biosolids", but from a physical-chemical point of view the basic medium (where interactive processes are applied) changes its state and composition as the treatment progresses. The medium changes from a liquid composition with a high concentration of dissolved compounds and total solids (TS) around 1% to a solid material (TS content 70-98%). This medium is passing through all stages between liquid, dense suspension, slurry to solid phase during the treatment. Subsequently, the amount of a particular process in the media and its impact as well as interaction on other processes change with time. The present invention referred to herein as EKDIM considers all these stages. No other sludge treatment technique collectively addresses (optimizes) dewatering, pathogen inactivation and metal removal in a single chamber in one technology.

The ion exchange textile (IET) of the present invention serves effectively in all of the transition states mentioned above. So far the IET are used to liquid industrial wastewater with a high concentration of dissolved metals. For the IET to work properly liquid wastewater has to be pumped throughout the textile in the prior art. It is not possible to do that in the case of biosolids/sludge due to the following: 1) large pressure loss at the IET, 2) fast clogging of the IET due to increase of the solid content and decrease of the liquid content with time; 3) coating of exchange surfaces with biofilm, 4) formation of gel-like phase and slurry which make pumping through textile impossible, 5) metals are sorbed to colloids—must to be dissolved before using IET—one more unit operation has to be added to the system in the case of standard application of the pumping system, and 6) metals are in the form of organo-metallic complexes, meaning they are too large for application directly to IET in common system (an additional process should be added leading to additional costs and technological difficulties).

Presence of an electrical field and a conditioner address the above mentioned problems of the prior art. Electrical DC creates a number of electrochemical processes, which are particularly useful in each subsequent form of the biosolids: liquid, slurry and solid. The changes observed within electrochemical processes facilitate the following:

Due to electro-coagulation and settling, the liquid is continuously generated during all treatment processes—this phenomena is not only associated with flocculation processes, the presence of electrical field, and corrosion of electrodes introducing Me(III) ions onto the media, but also due to electrolyte change by introducing the ammonia or urea conditioner as well as behavior of IET in the electrical field, The gravity and electroosmotic transport is a major phenomena permitting the liquid passing through the IET—negative impact of pumping is eliminated.

Electrokinetic phenomena (oxidation zone and low pH, enhancement by addition of conditioner) change the speciation of metals, large complexes are broken, ionic forms and more soluble and mobile forms appear in liquid phase of biosolids.

Generally, colloids are charged in an opposite way to metallic ions (positive) which are mostly transported towards anode (negative). All other polar species present in such a complex system as biosolids are also transported towards respective electrodes. It was also observed that non-polar species are also transported in water due to electroosmosis (generally towards the cathode). These movements enhance the separation of solids, liquids and particular contaminants, permitting them to be transported towards perforated electrodes where they have a chance to be trapped by IET or discharged to catolyte (and/or anolyte) and subsequently sent out of the system (leaving behind clean biosolids).

Satisfactory removal of interstitial water out of colloids can be obtained only through the application of electrokinetics; no other common method is able to allow such effective dewatering of all kinds of biosolids and sediments. Simultaneous horizontal and vertical movements of solids as well as horizontal movement of water containing metals (and other organic pollutants) toward IET are recognized. Even if electro-dewatering is done commercially, these processes always use common coagulants, introducing new chemicals into the remaining biosolids in the prior art. In the case of the present invention, the conditioner is a nontoxic, biodegradable, natural product commonly used for biomass growth.

Another effect never described before the present invention is the lack of clogging of the IET by solids (colloids) even in the anode area as an exchange by-products released from the IET into the water and create their dense concentration in the liquid surrounded electrodes affecting the properties of colloids in such a way that they do not crossing a ring around the IET.

Interactions of IET and electrokinetic phenomena of note are described in the following:

Release of exchangeable functional groups (e.g. $CH_3$) or metals (e.g. $Na^+$) into biosolids change the properties of the electrolyte.

Installation of anionic ion textile prevents strong oxidation of by-products released into biosolids; therefore, the oxidation can be controlled in the system.

Installation of the IET changes the pH gradient between cathode and anode, and the amount of oxidation products. Therefore, it is possible due to the proposed design to adequately control pH and oxidation, and subsequently all of the above mentioned phenomena. The control can be done by variation of voltage gradient, current density change, and change in the design of electrodes by decreasing activity of IET (leaving some percentage—e.g. 30 to 50%—of the electrodes not perforated and not covered with IET).

The design of electrodes is unique to the present invention. IET's are located at a distance from the surface of electrodes which permit the evacuation of gases produced on the surface of cathode ($H_2$) and anode (e.g. $O_2$). Thus the gases do not occupy the exchangeable place and do not clog pores in the textiles, and they do not get stuck on the surface of the electrodes (which can lead to current density change and subsequently to all other changes associated with the presence of electrical field).

The present configuration of the electrodes is not obvious in view of the prior art showing only a general concept of some electrokinetic phenomena using one cathode and one anode. In fact, a configuration of 3 or 5 rows of electrodes can be changed with a group of electrodes where each electrode can be reversibly connected to the anode and to the cathode. In addition, for some biosolids (anaerobically digested) the electrodes are positioned in an alternating sequence (e.g. anode-cathode-anode-cathode-etc.) in each row which can give better results due to covering all affected areas more uniformly.

The main objective of the present invention is the development of a new sustainable technology, which combines several unit operations using electrokinetic phenomena in order to upgrade sludge to Class A/EQ (Excellent Quality—as defined by the US EPA and as recognized in several provinces including Quebec), electrokinetic (EK) dewatering, inactivation, volatile solids reduction and metal removal.

Various research programs at batch, bench and pilot scale levels and a technology referred to herein as EKDIM (ElectroKinetics, Dewatering, Inactivation of pathogens, Metal removal) have been developed and tested. It has been demonstrated that application of DC through a specially designed electrode systems into the biosolids initiated simultaneous and subsequent electrokinetic phenomena, which can be controlled within the EKDIM technology and which led to upgrading the treated biosolids to Exceptional Quality/Class A level and above.

To broaden the application of EKDIM technology, sludge of different origin was used in researching the present invention including: primary sludge alone, primary sludge (PS) combined with sludge after attached growth treatment, combined primary and waste activated sludge (WAS), and anaerobically digested combined (PS+WAS) sludge. Wastewater treatment plants in Auteuil, Quebec, Canada; Ottawa Ontario, Canada; and Syracuse, N.Y., USA were sources of the above-mentioned sludge.

The results showed successful EK dewatering of all types of solids tested, particularly when a conditioner was applied, for example an amphoteric conditioner. The combined (PS+WAS) sludge reached 75% total solids TS (max 99%) at bench scale and 43% (70% max) in pilot scale. The starting, initial total solids ranged between 2 and 5%. The dewatering of primary sludge led to an average 75% TS (max 85%), while anaerobically digested sludge reached TS of 35 to 55% (max 79%). Studies showed that EK dewatering depends on electrical field and sludge physical properties (flocs, electrical charge), type of sludge, amount of total volatile solids (TVSS), pH, and conductivity. Some of these parameters are affected by the use of a conditioner liquid, which can be reused as it is collected at the electrodes. Among all type of waters associated with a floc (hydration, vicinal, interstitial, and free water), only electrokinetic treatment was able to affect all the fractions of water in the sludge particles leading to more efficient dewatering than in the conventional dewatering—such as, for example, in the high-shear centrifuges.

The EK metal removal was observed in all types of biosolids tested. EK phenomena enhanced with "amphoteric" conditioner created satisfactory conditions for metal removal. Finally, in both bench and pilot scale tests, the removals were achieved as follows: 71-90% of zinc, 70-97% of nickel, 50-69% of copper, 61% of cadmium, and 83-99% of iron. By removal we mean transport of the metals with catholyte (liquid collected on the cathode) or captured on electrodes. A complete removal of lead was achieved in lab scale with the higher concentration (40 g/L) of conditioner. Some 73% lead removal was confirmed in pilot scale, with the lower concentration (13 g/L) of conditioner. In all cases the resulting metal concentrations in sludge after dewatering were below allowable level of Quebec regulations. Differences in various metal removals were associated with a different speciation of metals under different EK conditions. In general, lower current applied over a longer period led to superior overall results for heavy metals removal. All results demonstrated mobilization of metals due to the electrokinetic phenomena.

In order to assess the best conditions for metal removal from sludge under EK phenomena, a series of simulation studies were also performed using Software Visual MINTEQ adapted to the biosolids conditions. These studies showed that the EKDIM changed the form the metals are in. The principal transformation was from an organometallic complex to mobile ionic forms. These forms accelerate ionic and electroosmotic transport of metals, mostly towards the cathode. A new databank was created for the purpose of biosolids management and a number of relationships were generated for large pilot scale and full-scale applications of the EKDIM technology.

The optimization of metal removal efficiency included a study of an impact of electrode materials (such as stainless steel and carbon) as well as their configuration. During the studies a circular electrokinetic cell was also tested and shown to be an effective configuration. In addition, a new multifunctional cathode was also designed. Due to ion exchange processes at the cathode, this design permitted an effective capture of metals before their transport with catholyte or their precipitation in the liquid. The design of an EK system with multifunctional electrodes gave the best metal removal from biosolids.

Several cities in Canada (Calgary, Red Deer, and Edmonton Alberta) and in USA are required to store sludge outdoors in liquid or semi-solid slurry form before land application. Therefore, a series of tests were performed to simulate cold weather conditions. The temperatures used were −8° C. and −15° C. The results showed the technical feasibility of EKDIM application during the winter season. In addition, it was demonstrated that EKDIM could control the freezing point of biosolids, and thus extend the duration of the process. Since the storage is mandatory this provides an opportunity to upgrade the solids in the idle winter period.

Most sludge applied on land in Canada/USA is Class B. Class B denotes biosolids subjected to Processes that Significantly Reduce Pathogens (PSRP) but which do not permit broader use since pathogens are still present in smaller reduced quantities. In order to investigate the EKDIM Process to Further Reduce Pathogens (PFRP), studies on biosolids inactivation were initiated by using indicators and working with two types of combined and two anaerobically digested sludges (as defined above).

The following indicators of inactivation were considered: fecal coliform (FC)— an indigenous bacteria, *Salmonella* spp,—an indigenous and introduced bacterial indicator, reovirus—an introduced viral indicator substitute for polio virus, *Ascaris ova*—an introduced helminth, *Clostridium perfringens*—an indigenous bacteria and spores. Practically, no FC and *Clostridium perfringens* bacteria were detected in all EK cells and effluents (catholyte or anolyte) after application of EKDIM.

A complete inactivation of *Salmonella* was observed in a significant number of tests, however all tested sludges met Class A criteria. A number of technological specifications were described. For example, anaerobically digested sludge reached better inactivation of *Salmonella* spp and dewatering under lower voltage conditions. However, combined sludge achieved better inactivation under higher voltage while the dewatering efficiency was better under lower voltage conditions.

Studies on inactivation of *Clostridium perfringens* spores, reovirus and *Ascaris ova* included testing of a combination of three conditioners: ammonia salts ("amphoteric"), GTA and Bioxy S/TAED. After 3 days of EKDIM treatment of anaerobically digested sludge, the 4.5·log reduction of *Clostridium perfringens* spores was observed. The most effective conditions were when GTA and Bioxy S/TAED enhanced by electrokinetic phenomena (at the constant voltage of 0.7 V/cm) were applied. The work showed that EK system, GTA and Bioxy S/TAED, as enhancer agents, are not sufficiently effective when used alone. In other words, spore inactivation could be obtained only through the combination of EK system and enhancement agents. Assessment of results showed that different factors which attack numerous spore constituents, including spore coats, proteins, unsaturated lipids, respiratory enzymes, peptidoglycans are involved in inactivation of *C. perfringens* spores in the EKDIM technology. Reactions produced due to the EK phenomena help to create effective oxidative zones, which neutralize protective systems inside and outside of *C. perfringens* spores.

It was also observed that EKDIM technology was successful in virus inactivation. All applied conditions were successful in achieving a ten-log reduction of reovirus, which is considerably more than the desired three-log reduction, in anaerobically digested biosolids. When direct current (DC) is applied to biosolids, electrochemical phenomena include electrolysis, generation of variety of oxidants (chloride ions, hydrogen peroxide, etc) in anode zone as well as hydroxyl radical and free ammonia in the cathode zone. Then, a strong gradient of oxidation-reduction potential (ORP) and gradient of pH (between 2 and 9) between electrodes was observed in all tests. These conditions increase the virucidal and biocidal activity of EKDIM system. Furthermore, application of enhancement agents, GTA, Bioxy S/TAED, improves inactivation effect. The established reactivity of GTA with proteins suggests that the viral capsid or viral-specific enzymes are vulnerable to GTA treatment. Bioxy S/TAED is most effective in the pH close to 7 (middle area of the EK reactor). "Amphoteric" conditioning agent is important in production of ammonium ions and consequently ammonia and ammonium chloride in the system. The developed combination of electro-biochemical processes plays a significant role in inactivation of reovirus in EKDIM system.

Similar processes are effective in inactivation of helminths. A complete inactivation of *Ascaries suum* ova after application of EKDIM was found in both combined and anaerobically digested sludge. Alteration of the egg's inner lipid membrane integrity at the higher electrical field strengths could have been found at the higher ionic concentrations of the "amphoteric" conditioner. This increased permeability can render the eggs more susceptible to the inactivation effects (for example, of the free radicals and hypo-chlorite species). If critical electrical field strength is exceeded, the membrane is subjected to pore formation. One can speculate that the higher concentrations of added conditioner in the extracellular medium above a critical level resulted in irreversible damage to the egg's inner membrane. It was assumed that a combined effect of electro-chemical and physical processes created by EKDIM was at the source of *Ascaris ova* inactivation. Other tests were also demonstrated that a short exposure of *helminth ova* to heat generated within the electrical field can very quickly and effectively inactivate ova.

The EKDIM system demonstrated high ability to combine various unit operations in one process and its applicability to variety of solids, which can be rendered free of nuisance metals and pathogens. This generated a question of potential EKDIM application to removal of other impurities, for example, endocrine disrupters such as estrogenic compounds. Basic preliminary investigations were done on the mobility of 17a-ethynylestriadiol within the biosolids to prepare the database for future exploration of an additional application of the EKDIM system.

The EKDIM is a new sustainable system that combines several wastewater treatment operations in one unit. Due to initiation of electrokinetic phenomena controlled by DC and conditioners, a simultaneous dewatering, metal removal and pathogen inactivation take place, leading to upgrading all types of municipal sludges to Excellent Quality biosolids ready to field application. While municipal sludges are primarily referred to herein, the EKDIM process is well suited to treatment of a variety of sludges, including industrial sludges, for example: a) oily sludge, b) sludge containing a mixture of different quantities of organic and metal compounds, and c) textile industry sludge. The significance of findings can be itemized below.

The EKDIM process:

a) is the first technology that combines at least three functions in one: dewatering and partial drying; pathogen inactivation as per US EPA requirements for class A and quality improvement which allows more unrestricted, beneficial use of biosolids;

b) requires low energy in form of DC and offers an appropriate technology low-tech solution to sludge management applicable to developed and developing regions of the world;

c) offers for the first time removal of metals from sludge thus eliminating the key obstacle preventing sustainable utilization of biosolids—this is very important to the industry as CCME is continuously lowering the allowable metal levels in land-applied biosolids;

d) simultaneously inactivates fecal conform, *Salmonella* spp and the extremely tough-to-kill spores, as well as viruses and *helminth ova*—this is the first extensive application of electric field to inactivation of the pathogens of concern and their indicator organisms;

e) allows dewatering to be conducted all the way to the water content range of drying process as through combination of process parameters solids with 80-90% TS were obtained (heat-dried pellets have 92% TS);

f) may be equally applied to batch and continuous flow systems;

g) can be applied equally in indoor and outdoor facilities, including cold-climate of western Canada—this allows the municipalities to use the idle winter period when the biosolids destined for land application must be stored; and h) may generate effluents (catholyte and anolyte) that are of a very high quality and do not contain pathogens, metals and other impurities—they can be directly discharged to the front-end of the wastewater treatment plant (WWTP).

Materials targeted by the present invention include:

1. Primary Sludge—residuals after primary treatment of municipal and industrial wastewater containing organic matter e.g. food processing, textile or pulp-and-paper industry sludge.

2. Secondary Sludge—residuals after biological treatment of municipal and industrial wastewater.

3. Anaerobically digested sludge—residuals after anaerobic stabilization of municipal and industrial sludges.

The present invention is advantageous in that dewatering, inactivation, metal removal, and EDC (or other impurities) removal are done simultaneously in the same unit operation.

As described herein, electrical DC current applied to sludge produces the following:

a) Electro-osmotic flow (generally toward cathode) of water that increases with the decrease of water content. Electro-osmotic flow grabs metallic complexes, polar and even non-polar organic compounds and viruses if it is strong enough;

b) Electrophoretic transport of solids (generally toward anode);

c) Oxidation conditions simultaneously with acidified zone expanding from anode area in which the oxidation conditions change speciation of metals to more mobile ionic forms, the oxidation inactivates some micro-organisms, the zone oxidizes the conditioner, ammonia to nitrate, nitrate to nitric acid, and the gases such as $O_2$ and $Cl_2$ are emitted;

d) Reducing conditions simultaneously with alkaline zone expanding from cathode area in which gases such as $H_2$ or $N_2$ are emitted;

e) Transport of charged species to respective electrodes, called ion electro migration;

d) Removal of bound water layer strongly associated with organic flocks, decreasing of a repulsive distance between the flocks, and subsequently initiating a coagulation process, and sedimentation of aggregates.

The addition of a conditioner (ammonia nitrate, urea) to an electrical field produces the following:

a) Enhances oxidation zone (nitric acid formation from nitrate close to anode) but simultaneously preserves the alkaline zone (ammonia) in the cathode area. This is the only compound that could enhance simultaneously both oxidation and reducing zones. The enhanced oxidation conditions inactivate a larger number of microorganisms (e.g. *E-Coli, Salmonella* sp, viruses).

b) Changes speciation of metals making them soluble and mobile. This is important as large organic-metallic complexes are not easily transported. The oxidation conditions change speciation of metals to more mobile ionic forms. Presence of conditioner creates low pH enhanced oxidation stage then, a number of metals could be found in their cationic forms, easily transported towards the cathode. The enhanced reducing conditions, high pH, and presence of ammonia inactivate *Ascaris ova*.

c) Changed surface chemistry conditions of organic flocks which enhance flocculation, separation of solids and water, leading to drier sludge cakes.

d) Control of the extent of oxidative and reducing conditions by varying the amount of conditioner per unit volume of sludge, thus controlling the cake dryness, pathogen inactivation and metal removal.

Electrokinetic dewatering produces the following results:

a) Decrease of water content due to gravity drainage and electro-osmotic flow (which also transport metals, viruses, and other impurities like EDC).

b) Removal of water associated with hygroscopic layer (normally not even touched by other common mechanical dewatering methods).

c) Increase of osmotic gradient in dry TS that decreases the survival of microorganisms (Salmonella, *Clostridium*).

d) Increase of total solids (TS) content to exceptional level (e.g. 90% or 10% water) in any type of sludge.

The ion exchange textiles contribute to the following:

a) Exchange cations (at the cathode) liberated by EK oxidation and addition of conditioner, which are transported by both electro-osmosis and electro-migration.

b) Exchange anionic species (at anode) transported by electro migration.

c) Change pH gradient between electrodes.

d) Prevent precipitation of metals at the cathode.

e) Allow removal of metals with exhausted textile—metals can then be extracted (recovered).

f) Contribute to formation of "barriers" around electrodes which prevent clogging of textiles with flocs.

Electrokinetic dewatering, addition of ammonia salts (or urea), application of an accurate voltage gradient between electrodes, and use of ion exchange textiles together all lead to simultaneous metal removal, inactivation and dewatering generating what US EPA calls Excellent Quality biosolids.

In a preferred design of the system, the electrodes provide the following roles and functions:

1. Water transported due to drainage goes out through: perforated tube-cathodes (metallic) and anodes (metallic, carbon, conductive PVC) in the case of batch system; flat perforated (or mesh) metallic panels for cathodes and anodes (batch system); perforated conveyor materials (continuous flow); or metallic perforated tubes with a mesh from the same material.

2. Water transported due to electro-osmosis goes out generally through cathode system.

3. Metals are captured by ion exchange textile located at the cathode (and anode) on plastic grid and protected by plastic grid (batch system); or ion exchange textile located under the perforated conveyor (continuous flow). Further metal extraction from ion exchange textiles can be accomplished after removing exhausted textiles.

4. Removal of some microorganisms with water in an initial phase of slow thickening/dewatering.

5. Providing an accurate electrical gradient between electrodes including: creation of oxidation processes at the anode area leading to increasing the mobility of metals, affect living cells, transform conditioner, initiate electro osmotic and electrophoretic movement; creation of reducing processes at the cathode area, affecting ova of helminths; and creation of pH gradient between electrodes in which all of these electrokinetic processes form a series stressors that inactivate microorganisms and *helminth ova*.

6. Possible shape of cathodes include: perforated metallic tubes of diameter (50 to 250 mm), length on entire depth of reactor (e.g. 1.5 m), distance in function of the type (resistivity) of sludge (0.5 m to 5 m); flat metallic mesh; flat metallic panels; semi-circular metallic electrodes on conveyor; or flat metallic strips on conveyor.

7. Possible shape of anodes include: perforated metallic, carbon, PVC tubes; flat metallic mesh; flat metallic panels vertical or horizontal; metallic, carbon, and PVC rods; flat metallic panel lying horizontally above the conveyor; cylinder with semi-circular anodes above the conveyor; metallic strips above the conveyor; or two Archimedes screws rotating in opposite directions A full scale batch system according to the present invention would typically include the following features:

1. Sludge after treatment flows to the conditioner chamber where it is mixed with a conditioner added from the balance chamber.

2. Sludge flows from conditioner chamber to the reactor.

3. The frame with an array of cathodes/anodes/cathodes (or other configuration) is submerged in sludge.

4. DC is applied to the electrodes, and the process is started. Until this moment, entire process duration is equal to a daily shift.

5. Simultaneously water is pumped off from the inside of electrodes.

6. After the treatment, the frame is moved up, removing from biosolids, and they can be taken for field spreading.

7. The verification of the anode's damage takes place. Ion exchange textile could be removed and exchange with new IET strips.

A full scale continuous flow system according to the present invention would typically include the following features:

1. Sludge is pumped to the conditioner chamber where it is mixed with a conditioner from the balance chamber.

2. Sludge is pumped to the perforated first conveyor for drainage.

3. Sludge from the first conveyor is transmitted to the second conveyor equipped with metallic strips.

4. At the anode area, metallic strips enter in contact with contactors and DC is supplied to the strips. The strips start to work as cathodes. Electrokinetic processes are produced.

5. Electro-osmotically drained water through the perforated conveyor for reaching IET.

6. IET's are attached in segments. Each segment can be removed separately after exhausting with metals and be exchanged.

7. Drainage water returned to the wastewater treatment process. Sludge discharged to a tank and sent to agriculture.

As previously described herein, the proposed system upgrades the biosolids above the Class A level or other sludges to an acceptable level of purity. The system is able to simultaneously dewater, inactivate pathogens, remove and capture metals as well as other impurities in one unique process. Particularly, metals are removed on ion exchange textiles and *Salmonella* spp, viruses, *Clostridium* p. spores and *Ascaris ova* are inactivated simultaneously with the electro-dewatering process.

Applications of the present invention include: i) municipal WWTP where EKDIM can be used for primary, secondary sludge as well as anaerobically digested sludge, ii) pulp and paper industry, iii) food processing industry, iv) textile industry, etc. The technique can also be applied to batch (disposal ponds, lagoons) and to continuous flow conditions.

The batch system according to one embodiment consists of: an array of cathodes and anodes attached to a bridge capable to move in vertical and horizontal directions. When batch reactor (pond, lagoon) has filled up with sludge, the array submerges in sludge and DC (at a particular level of voltage gradient) is supplied.

The array consists of metallic, carbon or PVC-conductor electrodes. Generally, they are perforated tubes permitting for liquid removal out of sludge. The electrodes are connected to DC power supply through a control table. The metallic part of the electrode is covered with a non-conducting grid, which is a support for the ion exchange textile. Then, the ion exchange textile is covered with another non-conducting grid. The cationic exchange textile serves to capture cationic forms and the anionic exchange textile serves to capture anionic forms (complexes) of metals when they are directed to the metallic electrode.

The configuration of electrodes can be changed where a central electrode plays a role of the cathode and electrodes on a perimeter are the anodes.

The transport of metallic forms takes place due to a drainage supported by electro-osmotic flow and ionic movement to respected electrodes.

The mobilization of metallic forms takes place mainly due to the oxidation front generated at the anode. In these conditions, speciation of metals is changed, and they are fund to be in more mobile, ionic forms. The oxidation can be enhanced by: materials used for anode construction, addition of a conditioner, and voltage gradient applied. In fact, a combination of all of them gives the best results for metals removal, for dewatering and for inactivation.

Dewatering takes place due to subsequent process: electroflocculation of suspended solids, electro-osmotic movement of water into cathode, evaporation of water and electrophoresis of sold particles. Each of these processes can be accelerated by: addition of a conditioner, change of the gradient, implementing of a blower or by increase of temperature.

Inactivation of biosolids is complex since not all microorganisms and their ova respond in similar way to a particular stressor created in DC electrical field. Subsequently, the inactivation of some of them (*Clostridium* p, *E-Coli*) requires strong oxidation conditions (low pH), in the case of others (*Ascaris ova*) it needs a high pH. However, some other microorganisms can respond only where additional stressors are also present (*Salmonella* spp). No other system can create both conditions simultaneously in the reactor.

In order to perform the simultaneous inactivation of microorganisms of concern, a conditioner is added. Ammonia salt substances (or urea) are not harmful and not expensive chemical, which are able to enhance simultaneously oxidation in anode area and reducing conditions in cathode area.

The same conditioner changes simultaneously speciation of metals (new complexes are formed, ionic forms appear) and subsequently, increases their mobility and removal.

The conditioner can be added in either granular or liquid form directly to the reactor or can be mixed with sludge in a pre-chamber before sludge flows to the reactor (pond). The liquid conditioner can be also injected through electrokinetic system during electro-dewatering process.

The continuous flow system according to one embodiment of the present invention consists of a series of cathodes located on a perforated conveyer and moving with conveyer. The anodes, which could have different forms to better serve a particular type of sludge, are grouped in a particular location. A contact supply of DC to the cathodes takes place when they approach to the anode location only.

The drainage takes place through the perforated material of conveyor. The ion exchange textile (permitting for metal capture from liquid) is installed below the conveyor. Additionally, a blower could be located below anode location. Other principles of the continuous flow process are the same as batch type process.

Various terms used herein are generally understood as follows:

Electrophoresis: Applied electrical potential difference which induces movement of suspended colloidal particles within a fluid medium.

Electroosmosis: Applied electrical potential difference which induces fluid flow in a charged particle matrix.

Ion exchange textile: IET is nonwoven fabric (e.g. viscose) grafted with polymers containing adequate functional groups ready for exchange with cations or anions present in the wastewater.

Oxidation: The oxidation takes place in the anode area. Subsequently, pH drops; an acidic front generates and propagates towards cathode. Simultaneously, hydrogen peroxide, and gaseous oxygen (and chlorine) might generate on anodes. An example of oxidation is in the present invention is:

$$2H_2O = O_2(g) + H^+ + 4e^-$$

Reduction: In the cathode area, hydroxyl groups in water and gaseous hydrogen on electrodes generate; subsequently, the alkali front is generated in cathode area. An example of reduction in the present invention is:

$$2H_2O + 2e^- = H_2(g) + 2OH^-$$

Endocrine Disrupting Compounds (EDC): EDC's describe organic and inorganic compounds that affect hormonal systems leading to different dysfunctions of organisms on a long term basis. Many pharmaceutical products (including estrogenic compounds) retain their properties during the wastewater treatment; then, having affinity to solid phase can be found in biosolids which—as in Winnipeg's case, are agriculturally applied.

Organic flocs: Wastewater sludge contains an unlimited number of compounds including organic colloids. These colloids behave as other colloids; then, in adequate circumstances, can create flocs and settle.

Water exists in different forms in biosolids including free water, interstitial water, vicinal water, and hygroscopic water, defined as follows: Free water which is not associated with any particles and can be removed by gravity; Interstitial, capillary water is trapped in the flocs and can be removed using a centrifuge; Vicinal water is physically bounded and can be removed by electrokinetics; and Hygroscopic water bonded tightly to the particle surface by hydrogen bonding (can be affected by electrokinetic phenomena).

Exemplary reactions at the Oxidation area include:

$$2H_2O = O_2(g) + H^+ + 4e^-$$

$$O_2 + NH_4^+ = NO_3^- + 2H^+ + H_2O$$

Production of $H_2O_2$ $$ML + 2H^+ = M^{2+} + H_2L$$

Phosphorous removal $$5Ca^{2+} + 3HPO_4^{2-} + H_2O = Ca_5OH(PO_4)_{3(s)} + H^+$$

$$Fe_3 + HPO_4 = FePO_4 \text{ (iron—effect of anode corrosion)}$$

Exemplary reactions at the Reducing area include:

$$2H_2O + 2e^- = H_2(g) + 2OH^-$$

Radicals OH.

The effects of oxidation and reduction in the presence of a conditioner create a combination of stressors that affected the microorganisms. Besides by-products of oxidation (strong oxidants) shown above and reduction, the dewatering process also increases the interstitial pressure to levels that affect osmotic pressure across cell's membranes. Furthermore, presence of ammonia itself is required for inactivation of some species (e.g. bacterial spores, *Ascaris ova*).

In anode area there is oxidation of ammonia and production of additional $H^+$—which is necessary according to: $O_2 + NH_4^+ = NO_3^- + 2H^+ + H_2O$.

In cathode area $NH_4$ preserves its properties—what is necessary. No other compound has such amphoteric behavior that permits it to act as reducer in reducing zone and oxidant in oxidation zone.

Regarding other conditioners, it seems that reducers and oxidants or acids should be introduced separately in adequate areas to achieve the requested effects of inactivation. However it can have a negative effect on electro-coagulation and dewatering, process.

Usually in electrochemistry the anode play a crucial role in oxidation process; then to achieve significant oxidation, special materials are applied—for example expensive platinum plated electrodes. In the proposed technology, to avoid costs, simple cheap materials such as (iron, stainless steel) are suggested and they still satisfied oxidation and reducing conditions generated.

The anion exchange textile and the cation exchange textiles have different functional groups grafted on textiles, therefore, they are involved in different ion exchange reactions according to the following:

$$H^+\{Cat(s)\} + M^+ + X^- = M^+ - \{Cat(s)\} + H^+ + X^-$$

$$OH^-\{An(s)\} + H^+ + X^- = X^- + (An(s)) + H_2O$$

Biosolids present a complex multi-component system, where, anions, cations, metal complexes, organic and inorganic colloids and microorganisms, etc carry electrical charges. Subsequently, they have being subjected to electrical field response to electrokinetic phenomena: electrophoretic movement and ionic movement. Some complexes can be negatively charged and some organic colloids might change their charge and can flow towards anode. Therefore, it is important to control electro-coagulation process as soon as possible.

In addition, with increase of percentage of total solids within the system, stronger electroosmotic movement provokes a stronger movement even no charged and non-polar compounds. In our technology we have focused on metal species, microorganisms and organic micro-scale and nano-scale compounds.

Metal speciation is related to pH and redox potential. Electrokinetics in presence of conditioner creates perfect conditions to form ionic forms of metals since low pH and high oxidation stage is necessary as follows: $ML + 2H^+ = M^{2+} + H_2L$.

In sludge, many metals are in large rather non-mobile organo-metallic complexes. The technology breaks these complexes and depending on pH/Eh conditions creates new much more mobile form of metals (ionic or much more soluble).

Generally, electrophoretic movement is opposite to the electroosmotic movement which facilitates separation of phases. Efficiency of electrosmotic flow is related to the solids content and their charge. At the beginning at the low solids content, free water can be evacuated through both perforated cathodes and anodes. It accelerates the dewatering process.

Since various modifications can be made in this invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A treatment method for treating sludge, the method comprising:
providing a treatment chamber having an effluent outlet;
placing the sludge to be treated in the treatment chamber;
providing a plurality of electrodes in the treatment chamber so as to be in communication with the sludge in which at least one of the electrodes is in proximity to the outlet;
providing an ion exchange textile in proximity to said at least one of the electrodes in proximity to the outlet, the ion exchange textile comprising exchangeable functional groups grafted thereon;

simultaneously electro-dewatering the sludge, electro-kinetically removing metals from the sludge, and inactivating pathogens in the sludge commonly in the treatment chamber by applying an electrical current between the electrodes such that at least one of the electrodes functions as an anode and at least one of the electrodes functions as a cathode and such that:

a flow of water is induced from the sludge towards the electrodes in proximity to the outlet; and ionic forms of metals in the sludge are drawn towards at least one of the electrodes in proximity to the ion exchange textile where the ionic forms of the metals are exchanged with the functional groups on the ion exchange textile.

2. The method according to claim 1 including arranging the ion exchange textile to be porous and locating the ion exchange textile to span the effluent outlet such that effluent must pass through the ion exchange textile to reach the effluent outlet.

3. A treatment method for treating sludge, the method comprising:

providing a treatment chamber having an effluent outlet;

providing a plurality of electrodes in the treatment chamber so as to be arranged to communicate with sludge in the treatment chamber in which at least one of the electrodes is in proximity to the outlet;

providing ion exchange textiles comprising exchangeable functional groups grafted thereon in which one of the ion exchange textiles is located in proximity to said at least one of the electrodes in proximity to the outlet;

placing the sludge to be treated in the treatment chamber; and applying an electrical current between the electrodes such that at least one of the electrodes functions as an anode and at least one of the electrodes functions as a cathode and such that:

a flow of water is induced from the sludge towards the outlet to dewater the sludge;

ionic forms of metals in the sludge are drawn towards at least one of the electrodes; and the ionic forms of the metals are exchanged with the functional groups on the ion exchange textiles;

wherein at least one of the ion exchange textiles is provided in proximity to both said at least one of the electrodes functioning as an anode and said at least one electrodes functioning as a cathode and providing different exchangeable functional groups grafted onto the ion exchange textile in proximity to the anode than the exchangeable functional groups grafted onto the ion exchange textile in proximity to the cathode; and whereby the sludge is dewatered and metals are removed from the sludge commonly in the treatment chamber.

4. The method according to claim 3 including liberating cationic species by electro-kinetic oxidation and exchanging the cationic species with the ion exchange textile at the cathode.

5. The method according to claim 3 including electro-migrating ionic species in the sludge towards the anode and providing an ion exchange textile in proximity to the anode to be exchanged with the anionic species.

6. The method according to claim 1 including locating said at least one of the electrodes functioning as a cathode in proximity to the outlet.

7. The method according to claim 1 including forming the cathode to comprise a conductive body with passages therethrough and supporting the cathode to span the effluent outlet such that effluent must pass through the passages in the cathode to reach the effluent outlet.

8. The method according to claim 1 including supporting the electrodes in an array within the treatment chamber in which each cathode includes an outlet passage in communication with the effluent outlet, and applying the electrical current to the electrodes such that at least some of the electrodes are alternately operated as the anode and the cathode.

9. The method according to claim 1 including converting metal compounds in the sludge to more soluble ionic forms prior to exchanging the ionic forms with the functional groups on the ion exchange textile.

10. The method according to claim 9 including forming an area of increased oxidation in proximity to the cathode.

11. The method according to claim 10 including reducing a pH level in proximity to said at least one of the electrodes functioning as an anode.

12. The method according to claim 1 including injecting a conditioner into the sludge such that the metals are converted to more soluble forms prior to being exchanged with the functional groups on the ion exchange textile.

13. The method according to claim 12 wherein the conditioner comprises ammonia salts or urea.

14. The method according to claim 13 including premixing the conditioner with the sludge prior to applying the electrical current between the electrodes.

15. The method according to claim 1 including injecting a conditioner adjacent said at least one of the electrodes locating the ion exchange textile in proximity thereto.

16. A treatment method for treating sludge, the method comprising:

providing a treatment chamber having an effluent outlet;

providing a plurality of electrodes in the treatment chamber so as to be arranged to communicate with sludge in the treatment chamber in which at least one of the electrodes is in proximity to the outlet;

providing an ion exchange textile surrounding said at least one electrode in proximity to the outlet, the ion exchange textile comprising exchangeable functional groups grafted thereon;

placing the sludge to be treated in the treatment chamber;

injecting a conditioner between the electrode and the ion exchange textile; and applying an electrical current between the electrodes such that at least one of the electrodes functions as an anode and at least one of the electrodes functions as a cathode and such that:

a flow of water is induced from the sludge towards the outlet to dewater the sludge;

ionic forms of metals in the sludge are drawn towards at least one of the electrodes; and the ionic forms of the metals are exchanged with the functional groups on the ion exchange textile, whereby the sludge is dewatered and metals in the sludge are captured commonly in the treatment chamber.

17. The method according to claim 16 including surrounding the electrode with the ion exchange textile and including a spacer element between the electrode and the surrounding ion exchange textile to support the ion exchange textile spaced outwardly from the electrode.

18. A treatment method for treating sludge, the method comprising:

providing a treatment chamber having an effluent outlet;

providing a plurality of electrodes in the treatment chamber so as to be arranged to communicate with sludge in the treatment chamber wherein at least one of the electrodes is in proximity to the outlet and wherein each electrode is formed to comprise a conductive body with passages therethrough surrounding an outlet passage in communication with the effluent outlet such that effluent must pass through the passages in the electrode to reach the effluent outlet;

providing an ion exchange textile in proximity to the outlet, the ion exchange textile comprising exchangeable functional groups grafted thereon;

placing the sludge to be treated in the treatment chamber; and applying an electrical current between the electrodes such that at least one of the electrodes functions as an anode and at least one of the electrodes functions as a cathode and such that:
- a flow of water is induced from the sludge towards the outlet to dewater the sludge;
- ionic forms of metals in the sludge are drawn towards at least one of the electrodes; and
- the ionic forms of the metals are exchanged with the functional groups on the ion exchange textile;

whereby the sludge is dewatered and metals are removed from the sludge commonly in the treatment chamber;

wherein the sludge is initially dewatered through the outlet passages in both the anode and cathode; and wherein the sludge is subsequently dewatered only through the outlet passages in the cathode.

19. A treatment method for treating sludge, the method comprising:

providing a treatment chamber having an effluent outlet;

providing a plurality of electrodes in the treatment chamber so as to be arranged to communicate with sludge in the treatment chamber in which at least one of the electrodes is in proximity to the outlet;

providing an ion exchange textile in proximity to the outlet, the ion exchange textile comprising exchangeable functional groups grafted thereon;

placing the sludge to be treated in the treatment chamber;

applying an electrical current between the electrodes such that at least one of the electrodes functions as an anode and at least one of the electrodes functions as a cathode and such that:
- a flow of water is induced from the sludge towards the outlet to dewater the sludge;
- ionic forms of metals in the sludge are drawn towards at least one of the electrodes; and
- the ionic forms of the metals are exchanged with the functional groups on the ion exchange textile;

whereby the sludge is dewatered and metals are removed from the sludge commonly in the treatment chamber;

displacing the sludge through the treatment chamber in a continuous flow from a waste inlet of the treatment chamber to a sludge outlet of the treatment chamber;

providing a bottom of the treatment chamber with passages therein in communication with the effluent outlet in which the ion exchange textile and the cathode are located adjacent the passages in the bottom wall in communication with the effluent outlet.

20. A treatment method for treating sludge, the method comprising:

providing a treatment chamber having an effluent outlet;

providing a plurality of electrodes in the treatment chamber so as to be arranged to communicate with sludge in the treatment chamber in which at least one of the electrodes is in proximity to the outlet;

providing an ion exchange textile in proximity to the outlet, the ion exchange textile comprising exchangeable functional groups grafted thereon;

placing the sludge to be treated in the treatment chamber;

applying an electrical current between the electrodes such that at least one of the electrodes functions as an anode and at least one of the electrodes functions as a cathode and such that:
- a flow of water is induced from the sludge towards the outlet to dewater the sludge;
- ionic forms of metals in the sludge are drawn towards at least one of the electrodes;
- the ionic forms of the metals are exchanged with the functional groups on the ion exchange textile; and
- continuing to apply the electrical current between the electrodes until a temperature in the treatment chamber is sufficiently elevated to eliminate *Helminth ova* or spores;

whereby the sludge is dewatered and metals are removed from the sludge commonly in the treatment chamber.

* * * * *